(12) United States Patent
Burton et al.

(10) Patent No.: US 6,320,142 B1
(45) Date of Patent: Nov. 20, 2001

(54) WEIGHING ASSEMBLY

(75) Inventors: Stephen Burton, Matlock; Graham Comley, Solihull, both of (GB)

(73) Assignee: Thames Side - Maywood Limited, Reading (GB)

(*) Notice: Subject to any disclaimer, the term of this patent is extended or adjusted under 35 U.S.C. 154(b) by 0 days.

(21) Appl. No.: 09/298,797

(22) Filed: Apr. 23, 1999

(30) Foreign Application Priority Data

Apr. 25, 1998 (GB) .................................................. 9808768

(51) Int. Cl.[7] ............................. G01G 19/52; G01G 21/00
(52) U.S. Cl. ................... 177/132; 177/126; 177/DIG. 9
(58) Field of Search .................................... 177/132, 238, 177/239, 240, 241, 242, 243, 244, 245, 261, 126, DIG. 9, 145, 154, 155

(56) References Cited

U.S. PATENT DOCUMENTS

| | | | |
|---|---|---|---|
| 4,258,810 | * 3/1981 | Susor | 177/128 |
| 5,119,896 | * 6/1992 | Freeman et al. | 177/244 |
| 5,294,756 | * 3/1994 | Lauber et al. | 177/119 |
| 5,459,289 | * 10/1995 | Burkhard | 177/244 |
| 5,770,823 | * 6/1998 | Piroozmandi | 177/132 |
| 5,801,339 | * 9/1998 | Boult | 177/261 |

* cited by examiner

Primary Examiner—Randy W. Gibson
(74) Attorney, Agent, or Firm—Renner, Kenner, Greive, Bobak, Taylor & Weber

(57) ABSTRACT

A mounting assembly for use in combination with a load cell adapted to measure the weight of an object is disclosed. The mounting assembly has a fixed portion (10) that includes a base and a support, and a moveable platform (20) adapted to be supported by the support when in its installation (non-working) position. The platform (20) is further adapted to be raised from its non-working position to a working position by means of a lever, the platform being supported by the load cell in this working position. In a preferred embodiment, a load cell is used as the lever to raise the platform onto the load cell as it is secured to the mounting assembly.

5 Claims, 5 Drawing Sheets

WEIGHING ASSEMBLY

This invention relates to improvements in weighing of objects, and in particular to an improved assembly for mounting a load cell.

It is known to measure the weight of a container or tank by placing the container or tank onto a load cell. Often, more than one cell is used and the combined total of the weights measured by the multiple cells is used as an indication of the overall weight. The load cell typically comprises a beam which is fixed at one end onto a mounting assembly and supports a load on a button at an opposing end. The load acting on the button deflects the beam, inducing stresses which can be measured. Of course, many other arrangements of load cell are known.

In order to correctly transfer the weight of the container or tank (and its contents) onto the load cell, it is known to provide a mounting assembly comprising a base onto which the load cell can be affixed and a movable platform. The mounting assembly is installed usually underneath the object to be weighed and the movable platform is secured to the object. The load cell is mounted onto the mounting assembly in such a manner that the weight of the object acts down onto the load cell through the platform. The mounting assembly steadies the load as well as locates it onto the load cell.

With large and heavy objects (up to 20 tonnes or more), there is considerable engineering expertise required to install the mounting assembly and the load cell in position relative to the load. As all the weight must be accurately guided onto the load cell, the object must first be lifted prior to inserting the mounting assembly. The object must then be lowered down onto the platform, which in turn is compressed onto the load cell.

It is known to provide a mounting assembly which can be installed prior to installation of a load cell. This comprises a base defining a support for a load cell, a moveable support member adapted to be moved relative to the base, and a moveable platform. The platform sits on top of the moveable support member, and in the installation (non-working) position, the support member is locked to the base in a first position. This allows the platform and support to be slid under the object. A load cell is then inserted into the mounting assembly below the platform. Finally, the support frame is lowered, causing the platform and the object to drop down onto the load cell. Eventually, the support is lowered sufficiently that all the load and platform is supported on the load cell. Thus, the load cell can be easily installed after the initial steelwork is complete and the mounting assembly has been set in position.

Whilst the prior art mounting assembly is advantageous in that it allows the load cell to be removed and inserted at any time after the mounting assembly has been installed, it is not without its problems. The moveable support member for the platform which can be raised and lowered relative to the base is complex to engineer, and must withstand high loads.

In accordance with a first aspect, the invention provides a mounting assembly for use in combination with a load cell adapted to measure the weight of an object comprising:

a fixed portion comprising a base means and a support means; and a moveable platform adapted to be supported by the support means when in its installation (non-working) position, in which the platform is adapted to be raised from its non-working position to a working position by means of a lever, and in which the moveable platform is adapted to be supported by the load cell in this working position.

The lever may comprise a load cell. Thus, the mounting assembly may be adapted to be moved into position relative to the object in its installation (non-working) position and a load cell may then be used to raise the moveable platform to its working position.

The support means may comprise a support member spaced from the base means by a support frame to define a cavity. The support member may be fixed relative to the base means. The load cell may be located at least partially within the cavity.

The fixed portion may include one or more threaded mounting holes adapted to receive a respective threaded bolt for securing a load cell onto the base means. The support frame may be fixed relative to the base.

The load cell may comprise a shear-beam type cell, or any other known kind of load cell.

The support member may comprise a substantially planar element integral with the support frame and having an opening therein through which a portion of the moveable platform is passed.

The moveable platform may comprise a plate like member having an upper surface adapted to engage the load or object and a lower surface from which an extending portion projects. The extending portion may be adapted to be accommodated in the opening in the support member.

The support member may be provided with a raised protrusion or wall around the opening on its upper face. This may be adapted to contact the lower face of the moveable platform in the non-working installation position.

The raised protrusion may be a continuous or discontinuous wall having a substantially conical cross-section fixed around the opening in the support member. The top or peak of the wall may be machined flat. The raised wall is advantageous as it holds the platform slightly proud of the surface of the upper face of the support member. Any dirt or foreign bodies collecting on the support member fall off the sides of the wall onto the support members surface.

The extending portion of the moveable platform may be a loose fit within the opening in the support member. Thus, the platform is allowed to move in a plane parallel to the surface of the support member by an amount equal to the clearance between the extending portion of the platform and the opening.

A spacer portion may be provided on the free end of the extending portion of the platform. It may be held onto the extending portion by an O-ring which is provided around a circumference of the extending portion and is accommodated within a complementary recess in an upper face of the spacer portion.

The spacer portion may be provided with an elongate slot on a lower face which is adapted to accommodate a button of the load cell. The slot acts to locate the spacer onto the load cell. The spacer portion (and hence slot) may be free to rotate relative to the extended portion to allow the slot to be oriented in a preferred alignment relative to the extended portion.

According to a second aspect, the invention provides a mounting assembly according to the first aspect in combination with a load cell, in which a securing means may be provided whereby as the load cell is secured to the mounting assembly using the securing means, the load cell is adapted to pivot relative to the base means of the fixed portion to act as a lever to move the platform from the installation (non-working) position to its working position.

The securing means may comprise one or more bolts having a head and a threaded shank adapted to pass through one or more respective openings in the load cell to engage one or more respective threaded holes in the base means. The base means may have a stepped profile whereby a portion of the base means directly below the support member may be lower than a portion containing the threaded holes for the securing means, with a step defined between the two portions. The load cell may therefore extend across both portions and pivot about the step as the bolts are tightened, the bolt heads applying a downward force onto the load cell. Alternatively, shims may be used to raise one end of the load cell from the base or alternatively the load cell mounting face may be stepped instead of providing a stepped base.

The bolts may have an outer diameter of the threaded portion so dimensioned relative to the inner diameter of the respective hole in the load cell so that when the bolts are only partially tightened in the holes in the base means the load cell may pivot relative to the axis of the bolts and the base means yet when the bolts are fully tightened the load cell is prevented from moving. Alternatively, to obtain an improved mechanical advantage when levering the load cell into its working position. The load cell may be attached to a suitable lever plate with fixing holes positioned to provide a greater lever ratio from the pivot point than the load cell fasteners.

Thus, the invention provides for an assembly for weighing an object comprising a support and a platform which can be inserted in a non-working installation position and raised to a working position using a load cell as a lever, thereafter the load cell being adapted to measure the weight of the object through the platform.

There will now be described, by way of example only, one embodiment of the present invention with reference to the accompanying drawings of which:

Figure 8:
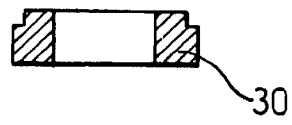
FIG. 8 is a side view of the portion shown in FIG. 7.
Figure 9:
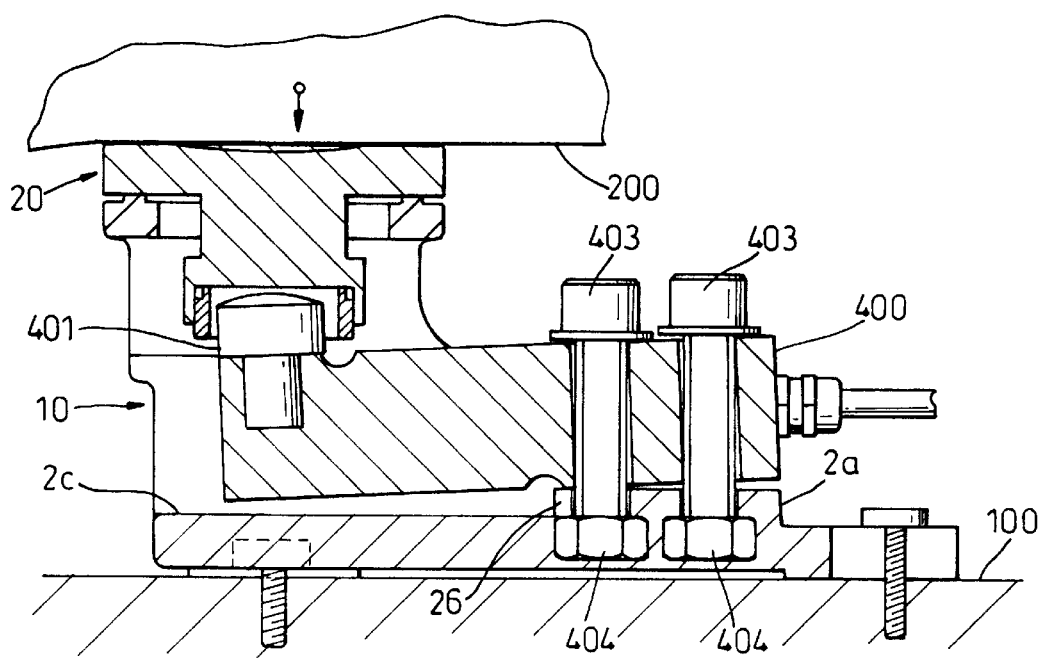
FIG. 9 is a side view of the complete mounting assembly with a load cell installed beneath a tank in its non-working position.
Figure 10:
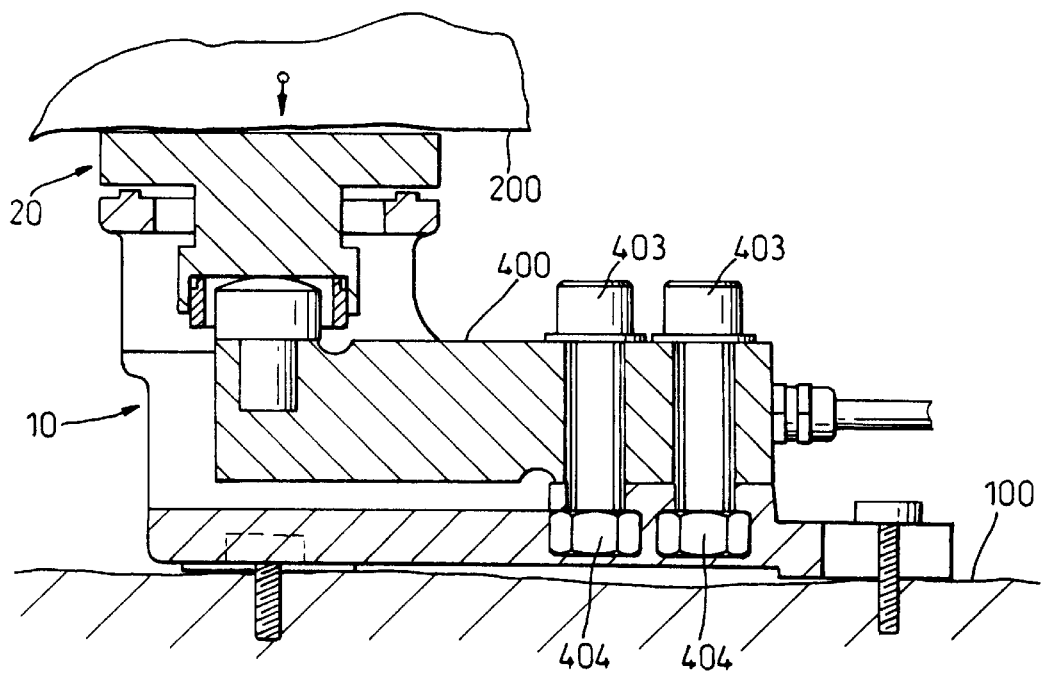
FIG. 10 is a side view corresponding to the view shown in FIG. 9 with the load cell firmly secured to the base and the platform raised up to its working position on the load cell button.

The mounting assembly is cast or moulded from metal or composites in three pieces. The first piece 10 comprises a one-piece base means and support means. The second piece comprises a moveable platform 20, and the third piece comprises an (optional) adjustable spacer ring. The three pieces are shown in isolation in FIGS. 1 to 8, and their interrelationship in the mounting assembly is shown in FIGS. 9 and 10.

The mounting assembly is designed to fit in a clearance below an object to be weighed (hereinafter referred to as the load) and to house a load cell which is adapted to perform the weighing process. Of course, the skilled man will appreciate that it could be located to a side of the object and carry the object through support brackets on the side or base of the object.

Figure 11:
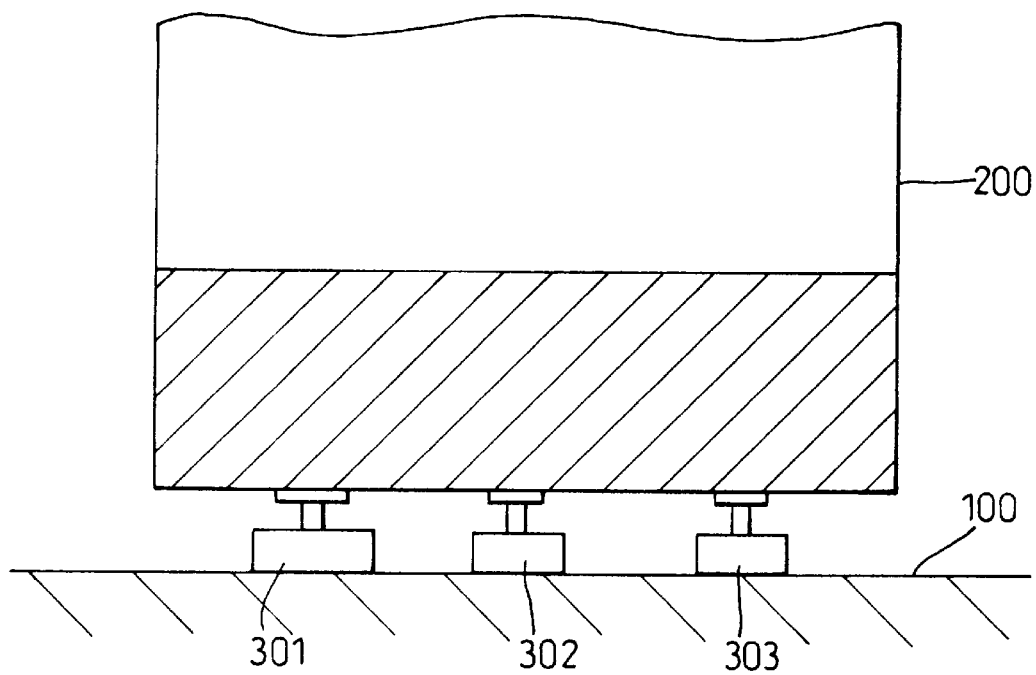
FIG. 11 is a side view showing three mounting assemblies positioned below a tank.
Figure 12:
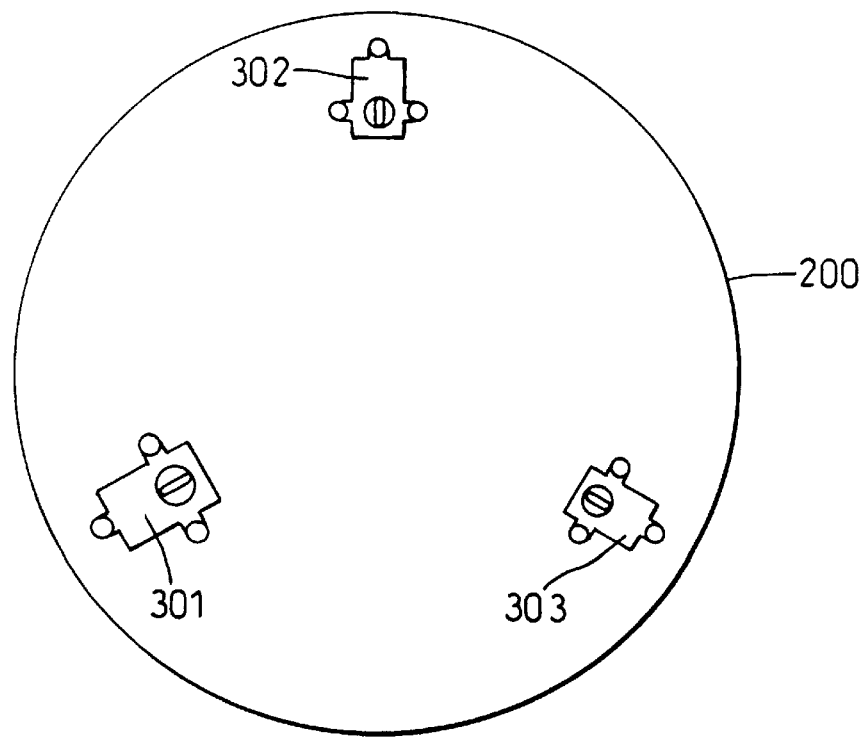
FIG. 12 is an overhead view showing the arrangement of the mounting assemblies below the tank of FIG. 11.

The first piece 10 comprises an elongate planar base portion 2 of substantially rectangular cross section having lugs 3a, 3b, 3c around its perimeter. The lugs are adapted to be captured by a respective bolt head (not shown) to mount the first piece securely onto a base plate 100 as shown in FIGS. 9 and 10. The base plate 100 is provided by the installer in situ below the object to be weighed. For ease of explanation, it is assumed that the object is a grain storage tank 200, and is to be weighed by three identical mounting assemblies 301, 302, 303 and load cells as shown in FIGS. 11 and 12.

Two parallel spaced apart side portions 4a, 4b project upwardly from the base defining a recess therebetween. The side portions define a support frame for a support member 6 comprising a substantially planar element spaced distal from and parallel to the base plate 2. The support plate thus provides a top cover for a part of the recess defined by the side walls 4a, 4b and the base portion 2 which extends for approximately half the length of the base portion 2. The side walls provide sufficient support for the support member 6 to carry the maximum expected load due to the object to be weighed in the event of a failure in any part of the system causing the object to collapse towards the base portion 2. The mounting is therefore typically designed to carry loads of up to 2 tonnes, 5 tonnes or 10 tonnes or more. The base 2, support frame and member 6 are cast in one piece.

The support member 6 is provided with a substantially circular opening 7 allowing access from directly above the base portion into the recess defined by the walls. The radius of the opening is in a plane substantially parallel to the upper surface of the base portion. Two keyways 8, 9 are provided on opposing sides of the circular opening. The purpose of the opening is, in use, to accommodate a portion of a moveable platform 20 shown in FIGS. 5 and 6. This portion engages, in use, with a load cell moulded in the recess defined by the base and the side portions.

The moveable platform comprises a substantially planar anchorage portion 21 and a substantially cylindrical extended portion 22 which extends downwards orthogonally away from the centre of a lower face of the anchorage portion 21. The extended portion is provided with two outwardly extending radial protrusions 23, 24 at its free end. The cross-section of the cylindrical portion and the extending protrusions 22, 23, 24 is substantially the same as the profile of the inside of the hole 7 in the support member. Thus, when the protrusions 23, 24 are aligned with the keyways 8, 9, the circular extension 22 may be passed through the opening 7 until the anchorage portion 21 rests upon the upper face of the support member 6.

The anchorage portion 21 is provided with a pair of spaced apart holes 25 which each contain a captive nut 26. These allow the platform to be fastened onto the support member 6 using bolts (not shown) which engage with openings in two lugs extending from the support walls 4a, 4b. The moveable platform 20 is also cast in one piece. In use, the anchorage portion is securely fastened onto a part of the load.

An upper face of the protrusions 23, 24 are spaced from the lower face of the anchorage portion 21 by a distance greater than the thickness of the side walls of the opening 8 in the support member 6. Thus, after inserting the platform into the opening 7 so that the lower face of the anchorage portion engages the upper surface of the support member, it may be rotated with the lugs 23, 24 below the support member 6. The lugs then prevent the platform being lifted fully away from the support member 6, whilst providing sufficient free play to allow the underside of the anchorage portion 21 to be raised above the upper face of the support member 6.

The installation of the mounting assembly and a load cell is shown in FIGS. 9 and 10. In use, the mounting assembly is installed below the tank with the platform in its lower installation position resting on the support member. The platform is then fixed securely to the underside or any other appropriate portion of the tank using bolts or a weld. In the installed position, the mounting base is secured relative to the platform such that the lugs prevent the platform being raised completely clear of the support member. This provides uplift protection, and prevents the tank from toppling over.

After the base 2 has been secured to the base plate 100 and the platform 20 has been secured to the tank 200, the mounting assembly is said to be in a non-working (installation position). The tank 200 is resting on the mounting support member through the moveable platform. It is prevented from lifting by the lugs 23, 24 engaging the underside of the support member and the bolts (not shown) in the nuts. The tank is therefore stable.

The platform of the mounting assembly is then moved to its working position by inserting a load cell into the recess defined by the base portion and the side walls 4a, 4b. The load cell 400 comprises a shear beam type load cell, and is initially loosely secured on a raised portion 2a of the mounting base 2. The cell is secured by bolts 403 which engage captive nuts 404 cast into the base of the mounting assembly. A step 2b is defined between the raised portion 2a and a second lower portion 2c of the base 2 positioned below the support member 6. In this position, the button 401 of the load cell 400 is positioned directly below the bottom end of the cylindrical extension of the platform 20. As the load cell 400 is gradually fastened down onto the mounting base, the load cell 400 acts as a lever by pivoting about the step 2b as a fulcrum to raise the platform 20 above the support member 6 until all the weight of the tank 200 acting down through the platform 20 is carried by the button 401 of the load cell 400. This is shown in FIG. 10. In the working position, the platform is raised approximately 1–2 mm above the support member from its non-working position. This distance is chosen to exceed the maximum deflection of the load cell button under load in use. The distance can be tailored with different load cells by adding shims between the bottom of the cell and the base.

To remove the load cell 400, for instance in the event of a failure of the cell or to provide a cell of a different type or operating capacity, the load cell is gradually released from the raised portion 2a of the base 2. The load cell then pivots relative to the base 2 about the step 2b until the platform 20 is lowered onto the support member 6 and all load is removed from the load cell button 401. It can then be extracted from the recess as the weight of the tank is supported by the mounting assembly. A lip 6a can be provided on the surface of the support member, which may be machined smooth on its crest. The lip then supports the platform in the installation position.

When the load cells are installed and the platforms are levered up to move the mounting assembly into the working position, substantially all of the weight of the tank is supported by the cells.

Thus, the force acting down on the load cell button 401 induces shear stresses in the load cell 400 which can be measured to provide an indication of the weight (and hence volume of contents of) the tank. If another type of load cell than shear-beam load cell is used, it may not need to induce shear forces. For instance, it may induce bending forces.

Ideally, there are one or snore load cells spaced evenly about the load so that each carries an equal portion of the weight. Of course, only a single centrally located load cell and mounting assembly may be provided.

In an alternative, the tank (or other load) may be supported upon more than one mounting assembly but only one of the mounting assemblies may be provided with a load cell to raise the respective moveable platform clear of the support member. The other platforms may be raised above their respective support by a dummy load cell. This may comprise a block of metal (or other material) which is secured to the base in the same way as a real load cell. The dummy cell acts as a lever to act upon the base of the circular extension of the platform to raise it clear of the support member. Thus, the weighing is performed by only the real load cell, whilst the dummy cell(s) act to raise the remaining platforms to the(ir) working position Where the load cell button supports a platform which is positioned away from the centre of the object, it is often important to provide means for accommodating thermal expansion of the object. In order to allow for expansion whilst providing adequate restraint of the object in other directions, the load cell buttons are located in an elongate groove provided in the base of the cylindrical extension of the platform. The axis of the elongated groove is arranged to be parallel to a radius extending from the centre of expansion of the object. Thus, in the case of a circular tank supported by a load cell positioned about a circumference of the tank, the axis of the groove is chosen to coincide with a radius drawn from the centre of expansion (i.e. the centre of the base of the tank). As the tank expands (or contracts), the load cell button therefore slides along the groove. The tank is held stable as it cannot be rotate circumferentially because of the sides of the groove engaging the sides of the load cell button.

Figure 1:
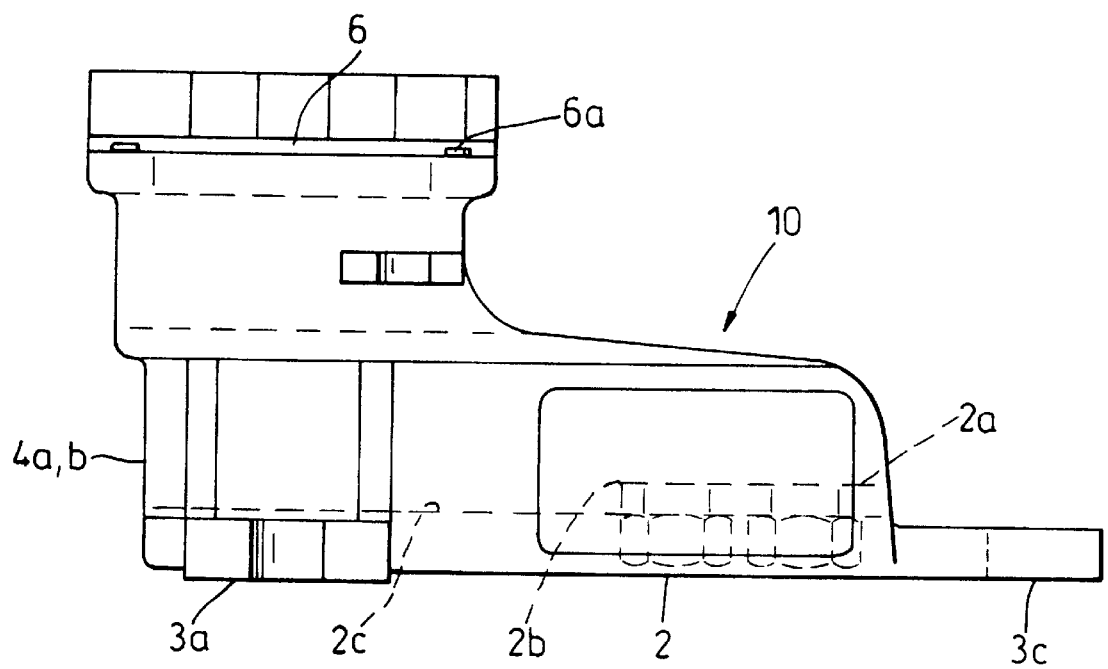
FIG. 1 is a side elevational view of the first portion of the mounting assembly.
Figure 2:
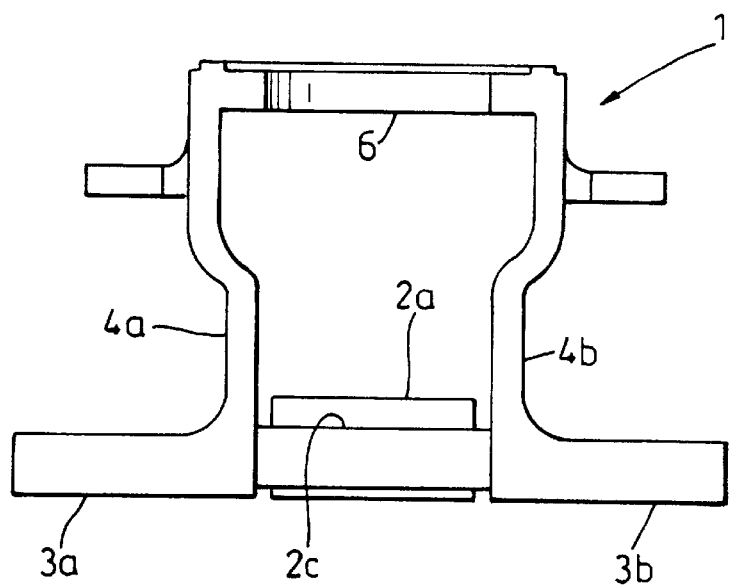
FIG. 2 is an elevational view of the first portion of the mounting assembly.
Figure 3:
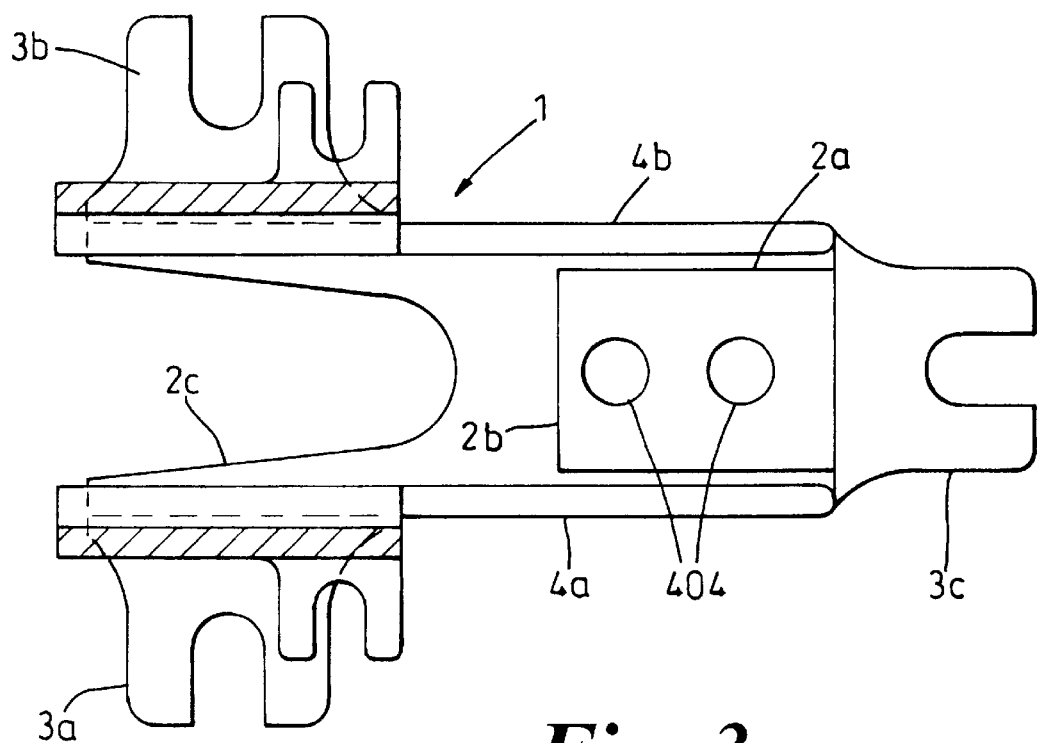
FIG. 3 is an overhead sectional view of the first portion.
Figure 4:
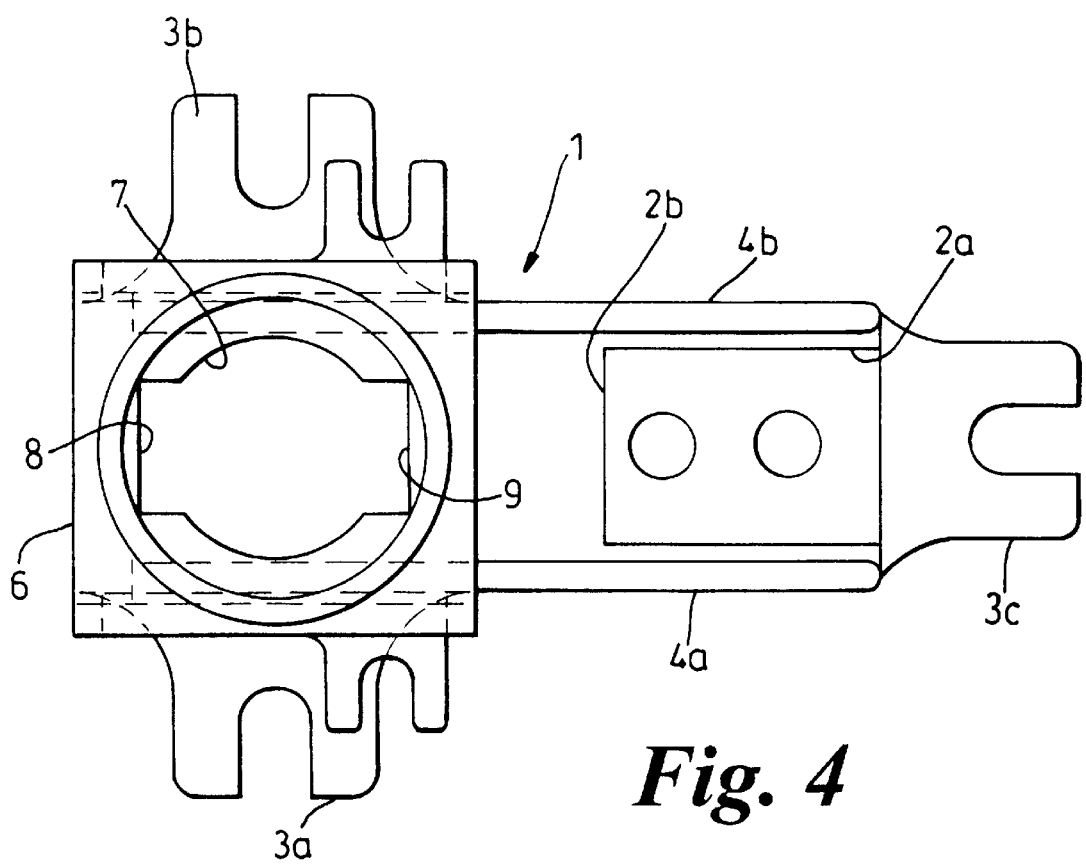
FIG. 4 is an overhead view of the first portion.
Figure 5:
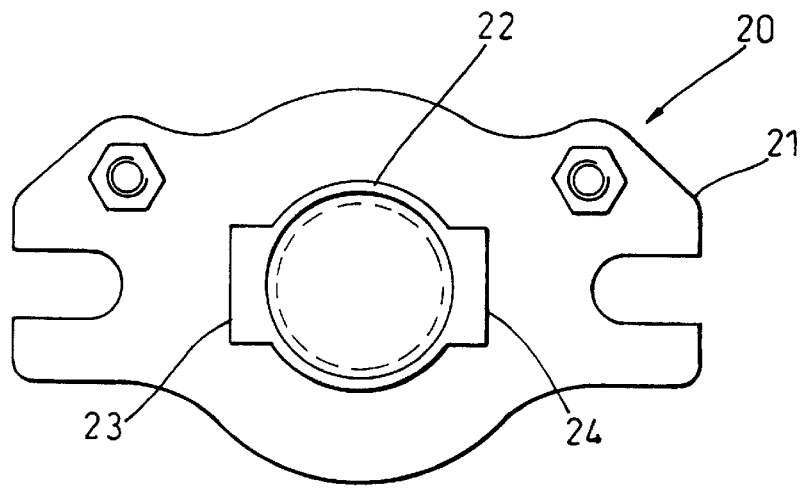
FIG. 5 is an overhead view of the moveable platform of the mounting assembly.
Figure 6:
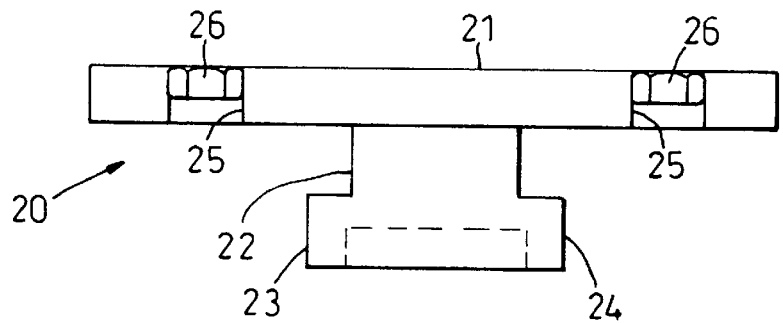
FIG. 6 is an end elevational view of the moveable platform of FIG. 5.
Figure 7:
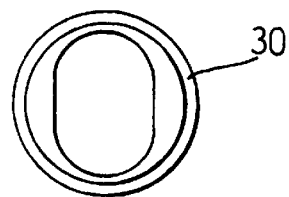
FIG. 7 is an overhead view of a spacer portion for mounting on an end of the cylindrical extension of the platform portion.

Often, it may only be possible to secure the platform to the base of the tank in one predetermined orientation. Also, the orientation of the mounting base may be limited by access and predrilled locating holes in the mounting plate. In order to ensure that the axis of the groove is correctly aligned regardless of the orientation of the moveable platform relative to the base, the groove may be defined in a spacing member 30 as shown in FIGS. 7 and 8. The spacing member 30 may comprise an annular plate having a recess on one side adapted to fit within a corresponding annular recess on the lower end of the cylindrical extension, and is held in place by an O-ring (not shown). Thus, the spacing member can be rotated relative to the platform around the O-ring so that the groove is in a preferred orientation.

What is claimed is:

1. A method of installing a mounting assembly for a load cell, the assembly comprising:

a fixed portion comprising a base and a support, and a movable platform adapted to be supported by said support when in its non-working position;

the method comprising the steps of:

(a) positioning said fixed portion and movable platform beneath an object to be weighed, such that said object is at least partially supported by said support;

(b) positioning a load cell between said fixed portion and said movable platform; and subsequently;

(c) using said load cell as a lever to raise said movable platform to a working position in which said object is supported by said movable platform and not by said support.

2. The method of claim 1 whereby said load cell is secured to said platform prior to positioning said mounting assembly below said object to be weighed.

3. The method of claim 1 in which said mounting assembly includes a securing means and said method further comprises tightening said securing means to said support so as to cause said load cell to pivot about a portion of said support in turn to act as a lever to raise said movable platform.

4. The method of claim 3 in which tightening of said securing means causes said load cell to pivot relative to said axis of said securing means.

5. The method of claim 3 which further comprises loosening said securing means to permit said load cell to lower said movable platform to decommission said assembly.

* * * * *